(12) United States Patent
Schultz et al.

(10) Patent No.: US 9,247,512 B2
(45) Date of Patent: Jan. 26, 2016

(54) ADAPTIVE SYNCHRONOUS PROTOCOL FOR MINIMIZING LATENCY IN TDD SYSTEMS

(75) Inventors: Gary Schultz, Cary, IL (US); Paul Odlyzko, Arlington Heights, IL (US)

(73) Assignee: Ubiquiti Networks, San Jose, CA (US)

( * ) Notice: Subject to any disclaimer, the term of this patent is extended or adjusted under 35 U.S.C. 154(b) by 462 days.

(21) Appl. No.: 13/217,428

(22) Filed: Aug. 25, 2011

(65) Prior Publication Data

US 2013/0051286 A1    Feb. 28, 2013

(51) Int. Cl.
H04L 12/28     (2006.01)
H04W 56/00     (2009.01)
H04J 1/16      (2006.01)

(52) U.S. Cl.
CPC ................. *H04W 56/0015* (2013.01)

(58) Field of Classification Search
CPC .......... H04J 3/0682; H04B 1/44; H04B 1/50; H04B 1/56; H04B 1/7073; H04B 7/26; H04W 28/18; H04W 56/00; H04W 72/0446; H04W 74/04; H04H 20/30; H04H 20/71; H04L 7/00; H04L 27/2655
USPC .......................... 370/278, 282, 252, 294, 442
See application file for complete search history.

(56) References Cited

U.S. PATENT DOCUMENTS

| | | | |
|---|---|---|---|
| 4,973,953 A | 11/1990 | Shimokawa et al. | |
| 5,416,797 A * | 5/1995 | Gilhousen et al. | 370/209 |
| 6,334,057 B1 | 12/2001 | Malmgren et al. | |
| 6,362,783 B1 * | 3/2002 | Sugiura et al. | 342/457 |
| 6,567,482 B1 * | 5/2003 | Popovic' | 375/343 |
| 6,643,496 B1 | 11/2003 | Shimoyama et al. | |
| 6,738,582 B1 | 5/2004 | Moshe et al. | |
| 7,000,031 B2 * | 2/2006 | Fischer et al. | 709/248 |
| 7,710,940 B2 * | 5/2010 | Van Der Wal et al. | 370/350 |
| 2002/0015393 A1 * | 2/2002 | Pan et al. | 370/335 |
| 2002/0142780 A1 * | 10/2002 | Airy et al. | 455/452 |
| 2006/0050677 A1 * | 3/2006 | Schafer | 370/345 |
| 2007/0274249 A1 * | 11/2007 | Hulbert et al. | 370/326 |
| 2008/0080553 A1 | 4/2008 | Hasty et al. | |
| 2008/0144493 A1 * | 6/2008 | Yeh | H04W 52/50 370/230 |
| 2008/0151801 A1 | 6/2008 | Mizuta | |
| 2008/0159239 A1 | 7/2008 | Odlyzko et al. | |
| 2008/0162048 A1 | 7/2008 | Yang et al. | |
| 2008/0291873 A1 | 11/2008 | Benveniste | |
| 2009/0245227 A1 | 10/2009 | Chin et al. | |
| 2010/0039979 A1 | 2/2010 | Takase et al. | |
| 2010/0232324 A1 * | 9/2010 | Radunovic et al. | 370/277 |
| 2011/0013601 A1 | 1/2011 | Cerasa et al. | |
| 2013/0077606 A1 * | 3/2013 | Wu et al. | 370/336 |

\* cited by examiner

*Primary Examiner* — John Pezzlo

(74) *Attorney, Agent, or Firm* — Antero & Tormey; Pete Tormey

(57) ABSTRACT

Systems and methods are presented that offer significant improvements in the performance of time division duplex (TDD) systems by utilizing an adaptive synchronous protocol. Conventional TDD systems are limited because data is transmitted during discreet and limited intervals of time, and because TDD transceivers may not simultaneously transmit and receive for reasons of insufficiently separated frequencies and limited receiver selectivity. Typically, TDD systems have significant latency due to the time to change from transmission to reception and the propagation delay time. By synchronizing the master nodes and the one or more remotes and by scheduling the traffic loads between these nodes, remote nodes may begin transmitting before the master node is finished with its transmission, and vice versa. This method reduces latency and improves the frame efficiency. Further, the frame efficiency may improve as the distance from the master node to the remote node increases.

20 Claims, 7 Drawing Sheets

ADAPTIVE SYNCHRONOUS PROTOCOL FOR MINIMIZING LATENCY IN TDD SYSTEMS

BACKGROUND

A time-division duplex ("TDD") system typically uses a single physical channel and carrier frequency. Further, a TDD system shares the information channel for both transmission and reception, where the transmission and reception signals are spaced apart by multiplexing the two signals on a time basis. TDD systems may support data transmissions (e.g. data or digitized voice or video), transmitting a short burst of data in each direction. It is preferable that the transmission periods are relatively short, so that there is minimal time delay detected for voice transmissions and control messaging resulting from the time delays introduced by using TDD.

Conventionally TDD schemes specify a guard time between transmission and reception. The guard time provides a safety margin against symbol interference in the time between sequential operations such as transmission, encoding, decoding or switching. This guard time should be sufficient in order to allow the signals traveling from the remote transmitter to arrive before a master node transmission is started and the master node receiver is inhibited. In other words, the master node should wait until the entire transmission from the remote node is received before the master node may begin transmitting. When changing between transmission and reception many times a second, even a small guard time may reduce the efficiency of the system because the guard time is idle time and is not used for transmission of information. For TDD systems communicating over short distances, e.g. up to a mile, the guard time is normally small and has a minimal impact on system performance. For greater distances the size of the guard time may be problematic because it must be set to a higher value.

Guard time and transmission length contribute to the latency in the operation of a TDD system. Consequently TDD systems may not be suitable for use over long distances as the guard time increases and the channel efficiency decreases. Thus, it would be beneficial to develop a method and system that minimizes the latency and maximizes the frame efficiency in a time division multiplex communication system.

SUMMARY

Disclosed here are systems and methods that offer significant improvements in the performance of time division duplex (TDD) systems by utilizing an adaptive synchronous protocol. Conventional TDD systems are limited because data is transmitted during discreet and limited intervals of time, and because TDD transceivers may not simultaneously transmit and receive for reasons of insufficiently separated frequencies and limited receiver selectivity. Typically, TDD systems have significant latency due to the time to change from transmission to reception and the propagation delay time. By synchronizing the master nodes and the one or more remotes and by scheduling the traffic loads between these nodes, remote nodes may begin transmitting before the master node is finished with its transmission, and vice versa. This method reduces latency and improves the frame efficiency. Further, the frame efficiency may improve as the distance from the master node to the remote node increases.

The adaptive synchronous protocol for a TDD system may comprise a master node and one or more remote nodes. The method may include steps such as:

a. Synchronizing the master node with the one or more remote nodes, wherein synchronization is based on an external source, wherein the master node receives ranging information;

b. Communicating from each of the one or more remote nodes to the master node a traffic load to be transmitted from each of the one or more remote nodes to the master node;

c. Scheduling the transmission of traffic loads from the master node to the one or more remote nodes, and from the one or more remote nodes to the master node wherein the master node does not simultaneously transmit and receive, and each of the one or more remote nodes do not simultaneously transmit and receive, and scheduling is arranged with the transition time between transmit and receive and receive and transmit minimized, and d. Generating a schedule based on the transmission of the traffic loads to and from the master node and each of the one or more remote nodes;

e. Communicating the schedule to each of the one or more remote nodes, or f. Transmitting the traffic loads based upon the schedule to and from the master node and the one or more remote nodes.

One or more of the steps presented above may be reiterated until a desired frame efficiency is realized.

The master node transmits a broadcast signal to and from the one or more remote nodes in order to synchronize the one or more remote nodes. The broadcast signal may be a preamble or pilot message. The synchronizing signal may initially to determine the range. In addition the synchronizing signal may be modified using techniques such as iteration, repetition and error correction. With the adaptive synchronous protocol, the one or more remote nodes may begin transmitting before the master node is finished with its transmission, and the master node may begin transmitting before the one or more remote nodes is finished with its transmission. The degree of overlap of the transmission of the master node and the one or more remote nodes is proportional to the range (distance between the remote node and the master node).

The construction and method of operation of the invention, however, together with additional objectives and advantages thereof will be best understood from the following description of specific embodiments when read in connection with the accompanying drawings.

BRIEF DESCRIPTION OF THE DRAWINGS

The components in the figures are not necessarily to scale, emphasis instead being placed upon illustrating the principles of the present specification. In the figures, like reference numerals designate corresponding parts throughout the different views.

DETAILED DESCRIPTION

Figure 1:
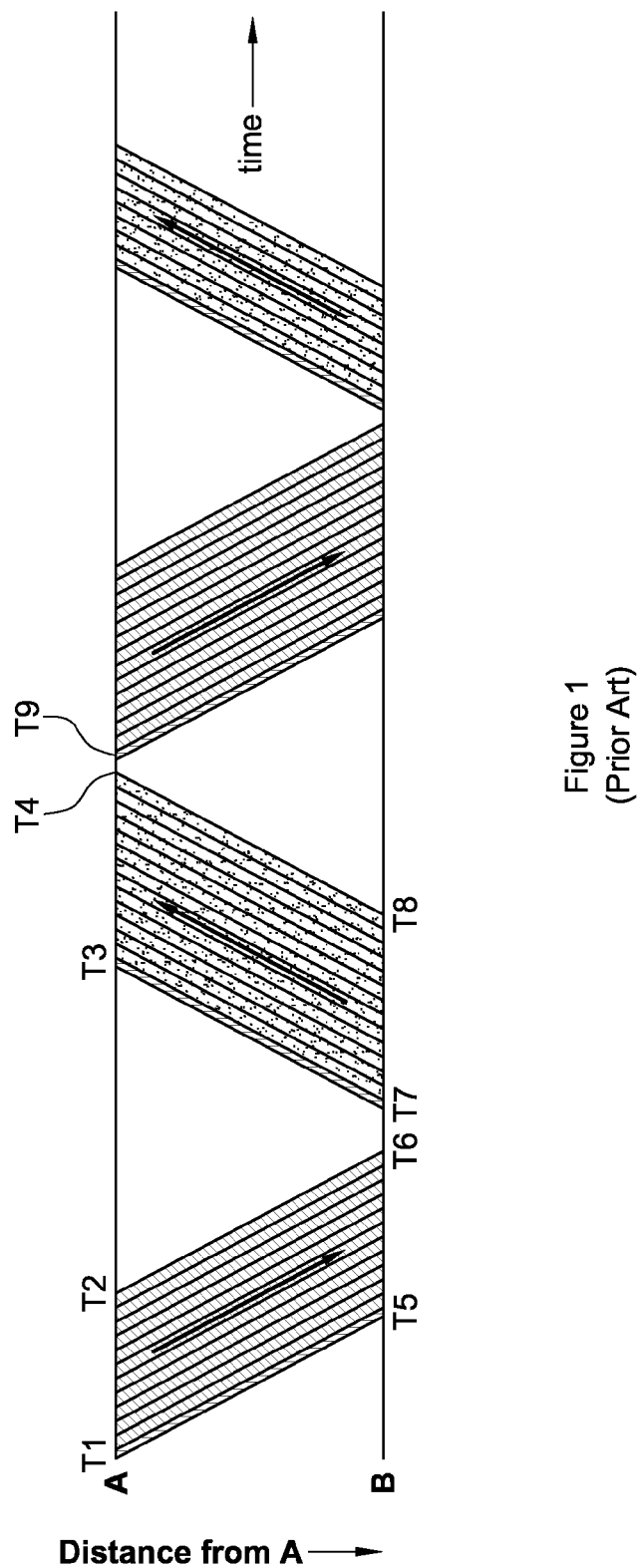
FIG. 1 illustrates a conventional embodiment where the nodes are idle after transmitting data while waiting to receive a transmission from the other side.

This application should be read in the most general possible form. This includes, without limitation, the following:

References to specific techniques include alternative and more general techniques, especially when discussing aspects of the invention, or how the invention might be made or used.

References to contemplated causes and effects for some implementations do not preclude other causes or effects that might occur in other implementations.

References to reasons for using particular techniques do not preclude other reasons or techniques, even if completely contrary, where circumstances would indicate that the stated reasons or techniques are not as applicable.

Furthermore, the invention is not limited to the specifics of any particular embodiments and examples disclosed herein. Many other variations are possible which remain within the content, scope and spirit of the invention, and these variations would become clear to those skilled in the art after reading this application.

Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Lexicography

Read this application with the following terms and phrases in their most general form. The general meaning of each of these terms or phrases is illustrative, not in any way limiting.

The terms "symbol rate", "baud rate", "modulation rate" and the like generally refer to the number of symbol changes (waveform changes or signaling events) made to the transmission medium per second using a digitally modulated signal or a line code.

The term "guard time" generally refers to a time interval left vacant (i.e., during which no data is sent) on a transmission channel that can be used for synchronization and/or compensating for a signal distortion. Conventionally, the guard time provides a safety margin against symbol interference in the time between sequential operations such as transmission, encoding, decoding or switching.

The phrase "processing device" generally refers to an electronic device capable of being programmed to execute instructions. These instructions may be persisted in memory for execution by the processor, or the processing device may be configured to execute instructions directly. A processing device generally includes a form of input/output such that the results of the processing are made available for further processing or to perform a task in another stage of processing. A processing device is made operable by providing and or executing instructions.

The phrase "access point", the term "AP", and the like, generally refer to devices capable of wireless communication with wireless devices and capable of either wired or wireless communication with other devices. In some embodiments, AP's communicate with external devices using a local network. However, there is no particular requirement that AP's have an actual wired communication link; AP's might communicate entirely wirelessly.

For the present specification, a "master node" may be referred to as an access point or AP and remote nodes may also be referred to as client stations or stations.

The term "orthogonal frequency-division multiplexing" or OFDM generally refers to a frequency-division multiplexing ("FDM") scheme used as a digital multi-carrier modulation method. A large number of closely-spaced orthogonal sub-carriers are used to carry data. The data is divided into several parallel data streams or channels, one for each sub-carrier. Each sub-carrier may be modulated with a conventional modulation scheme at a relatively low symbol rate, maintaining total data rates similar to conventional single-carrier modulation schemes in the same bandwidth.

The term "Latency" in the transport of packetized information over a radio link generally refers to the interval of time from the reception of an information packet at the sending node to the end of reception of that packet at the destination node. (A packet may be generated by an application in the sending node, or it may have arrived to that node on some communication channel for transmission.)

Conventional Systems

In packet transportation systems latency may result from several causes including, but not limited to:
 a. processing time at the sending node (e.g. encoding, etc.),
 b. queuing for transmission,
 c. transmission propagation delay (length of the encoded packet divided by the data rate), or
 d. processing of the packet at the receiving node (e.g. decoding, etc.)

Time-division duplex (TDD) introduces additional queuing delay for much of the traffic due to unavailability of the transmission medium during reception, turn-around intervals or medium acquisition attempts imposed by the communication protocol.

The guard time specified for TDD systems generally comprises two elements:
 a. The time specified for the propagation delay for any transmission from the remote transmitter to arrive at the receiver. This time requirement may depend upon the distances involved, and it may take approximately 3.3 microseconds to travel a kilometer, or approximately 5.3 microseconds to travel one mile.
 b. The time specified for the radio to change from reception to transmission. Switching speeds may vary considerably between TDD systems and may require a few microseconds to switch form receive to transmit and vise versa. If the transmit to receive switching time is fast, the system performance may be improved.

Latency introduced by a TDD link is often dominated by the delay imposed on the data queued up to be transmitted by a node, where the data is held in the transmit buffer because the node is in the receive mode.

FIG. 1 illustrates a prior art TDD system. Specifically, FIG. 1 shows the exchange of data between master node A and remote node B, with the time lost due to latency. In this case the propagation delay is a significant fraction of the frame duration, so that when the nodes are idle for much of the time—neither transmitting nor receiving. FIG. 1 illustrates an example of why it is preferable for the TDD systems to use long frames with longer propagation delays (e.g. on the order of 10 μsec.). And this situation places TDD links at a distinct disadvantage compared to frequency division duplex (FDD) links with respect to latencies.

On FIG. 1, the labels T1 to T9 indicate the timing events for a single link transmission between master node A and remote node B. At time T1, master node A begins transmitting a traffic load to remote node B. Due to the propagation delay, the transmission does not reach remote node B until time T5. Hence, the propagation delay is T5-T1. The master node A continues to transmit until time T2, and the final transmission from master node A is received at remote node B at time T6. Remote node B then stops receiving and begins transmitting. The time for this transition is time T7-T6. At time T7, the remote node B begins transmitting a traffic load to master node A. Due to the propagation delay, the initial transmission does not reach master node A until time T3. Hence, the propagation delay is T3-T7 (which equal to T5-T1 when the nodes are in fixed position relative to one another). The remote node B continues to transmit until time T8, and the final transmission from remote node B is received at master node A at time T4. Master node A then stops receiving and begins transmitting at time T9. The time for this transition is time T9-T4.

In the aforementioned sequence, the frame length is defined as time T9-T1. The frame efficiency for a node is defined as the ratio of the sum of the time for transmission plus the time for receiving, divided by the total frame time. Thus, for the master node A, the frame efficiency is ((T2-T1)+(T4-T3))/(T9-T1).

Conventional practice in terrestrial wireless communications may use the following ranges of values: frame of 2 to 20 milliseconds, symbol time (1/baud) 3 μsec to <200 μsec for multicarrier (OFDM) systems, turn-around time from 20 μsec to over 100 μsec (shorter delays are feasible with some additional circuitry).

Conventional TDD embodiments as illustrated in FIG. 1 may have the following characteristics:
  a. Data transmitted during defined and limited intervals of time, typically not exceeding several milliseconds (such as TDD systems).
  b. Transceivers that may not simultaneously transmit and receive for reasons of insufficiently separated frequencies and limited receiver selectivity.

The present specification is directed to improve the performance of TDD embodiments with the aforementioned characteristics. Therefore the present specification focuses on media access control (MAC) sub-layer induced latencies and not specifically on delays owing to retransmission of information due to repeat requests or timeouts triggered by lost acknowledgements.

Time Synchronization

One element of the adaptive synchronous protocol is time synchronization. In this regard, the protocol specifies that medium access timing is compatible with the way data are packetized or segmented for transmission. Time synchronization is enabled by a common clock or time reference, accurate to within fraction of a symbol (as this has direct bearing on the achievable efficiencies). This time synchronization may be enabled by sources such as GPS or carrier recovery loops recovering high frequency broadcast signals or any other global time reference.

With external synchronization, the remote nodes may begin transmitting before the master node is finished with its transmission. The degree of overlap is proportional to the distance between the remote and master nodes and allows for the time delay associated with the free space propagation of electromagnetic waves. This technique allows for the maximum utilization of the temporal bandwidth available in TDD/TDMA (Time Division Multiple Access) systems.

The methods of the present specification describe minimizing latency and excessive frame-induced delay in moderate and long range packet data systems. In conventional synchronous frame-based time division duplex system, subscriber or remote stations are coordinated in timed slots that allow for the maximum system capacity. Typically, the remote radio is assigned a time-slot based on its distance from the base or master station. The current practice and state of the art is to provide time-slots for close-in subscriber/remotes earlier in the frame and to place more distant subscriber/remotes later in the frame. The reason for this structure is to reduce the overhead and allow for the finite propagation speed of the radio signals carrying the packet data traffic. In free space conditions, the velocity of radio waves is approximately $3 \times 10^8$ m/s. Therefore radio waves may require more than 5 μs for a radio wave to travel 1 mile. In radio systems that are designed to operate over moderately long distances, this requires the conventional slotting mechanisms to leave a large amount of time (the product of time and data bandwidth is the measure of capacity and thus one key resource in TDMA systems) unused as the communication protocol waits for the propagation of the master station's map (instructions to the remote station) and the remote stations' response carrying traffic. This delay may impose a very significant penalty in traffic carrying capacity in a system with distant subscribers.

One having skill in the art will understand that the further distance the remote node is from the master node, the data rate may be a lower value. Also, the frame efficiency is maximized as distance between master nodes and one or more remotes increases.

Referring to FIG. 1, if the master node and remote nodes are separated by a distance of 50 miles (indicated by the distance from A to B in FIG. 1). At t=0 the master station sends instructions to the listening remotes that indicate when to transmit in the upcoming uplink portion of the frame. This information takes 50*5.3 μs=267 μs (time T5-T1) to reach the intended recipient at the remote end. Then, the remote node waits until the specified time in the following frame (perhaps 5 ms) to transmit. The signal from the remote node is sent and it also experiences the equivalent free-space propagation delay in the process of sending its packet data information back to the master station. Total round trip delay for the transaction from request to send and receive is 5.5 ms.

Minimizing Air-Time Delay

The present specification offers a method which minimizes the air-time delay and may be described as follows:

Assuming the same conditions exist as described above (50 mile separation), this method allows for the traffic from the downlink (master node originated traffic) to be generated and sent (transmitted) at the exact same instant that data carrying traffic is generated and sent (transmitted) by the remote node. This is enabled by the provision of time reference from a common external source, such as a GPS signal. In this embodiment, at T1=0 both the master node and remote node may begin to transmit so that the information carrying packet data radio signals pass each other at a point that is physically half way between the locations of the master and remote station. In this particular case the radio packets cross each other at a point that is 25 miles from each of the end points. Assuming a worst case of 1 frame latency for map decoding, the latency may be improved by 0.5 μs over the previous example. This represents an improvement in system traffic carrying capacity of at least 9%. The greater the distance between the end points of the links, the greater the benefit of this method of traffic synchronization.

References in the specification to "one embodiment", "an embodiment", "an example embodiment", etc., indicate that the embodiment described may include a particular feature, structure or characteristic, but every embodiment may not necessarily include the particular feature, structure or characteristic. Moreover, such phrases are not necessarily referring to the same embodiment. Further, when a particular feature, structure or characteristic is described in connection with an embodiment, it is submitted that it is within the knowledge of one of ordinary skill in the art to effect such feature, structure or characteristic in connection with other embodiments whether or not explicitly described. Parts of the description are presented using terminology commonly employed by those of ordinary skill in the art to convey the substance of their work to others of ordinary skill in the art.

Figure 2:
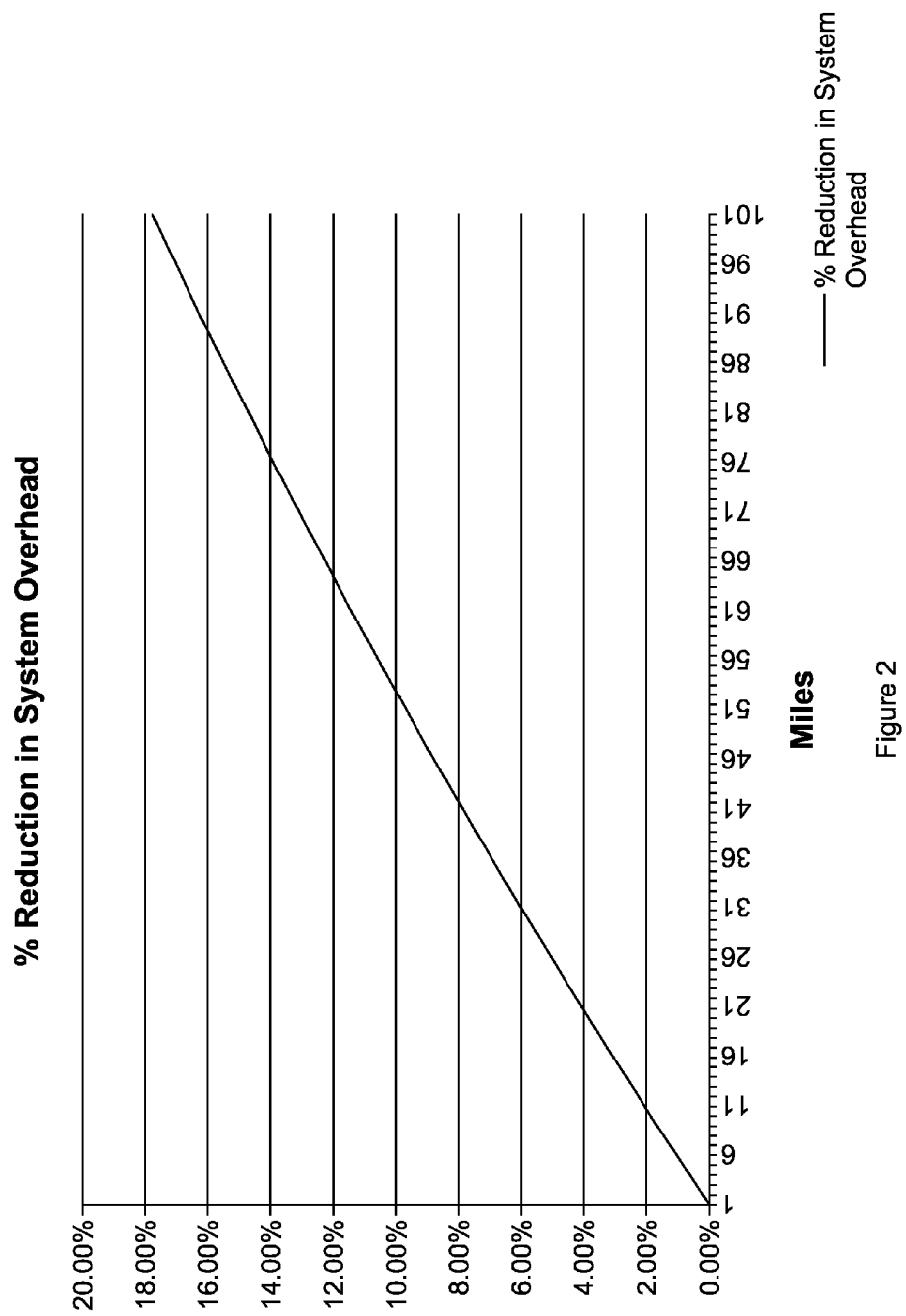
FIG. 2 illustrates the percentage reduction in system overhead according to certain embodiments.

FIG. 2 illustrates the percent reduction in system overhead as a function of the distance in miles between the nodes. The vertical axis represents the performance gain and the horizontal axis represents the link distance in miles. Per FIG. 2, a 50 mile distance between the nodes may result in a 10% reduction in system overhead.

System overhead may occur at the master node under at least two conditions: 1) if the receiver is transitioning to the transmitter, and vice versa, and 2) if the master node operations is restricted due to the scheduling.

In general, the capacity of the system increases if transmissions are scheduled to arrive at the destination when the receiver is ready and the interference is low. For example and without limitation, it is possible to eliminate the idle time at both ends of the link, by ensuring that either the transmitter or the receiver is active, or at least not prevented from operating because of waiting for the signals propagating to or from the other end of the link. This performance improvement is achieved by concurrent transmissions by the nodes, and is timed in such a way that the signals arrive at the intended destinations at the available intervals of time. The minimum duration of transmissions has to be a fraction of the propagation time and the turn-around times and may be as short as possible in order to achieve the desired improvement in capacity. This situation may cause the scheduling of transmissions to be different for the nearby remote nodes than for the nodes farther away.

Figure 3:
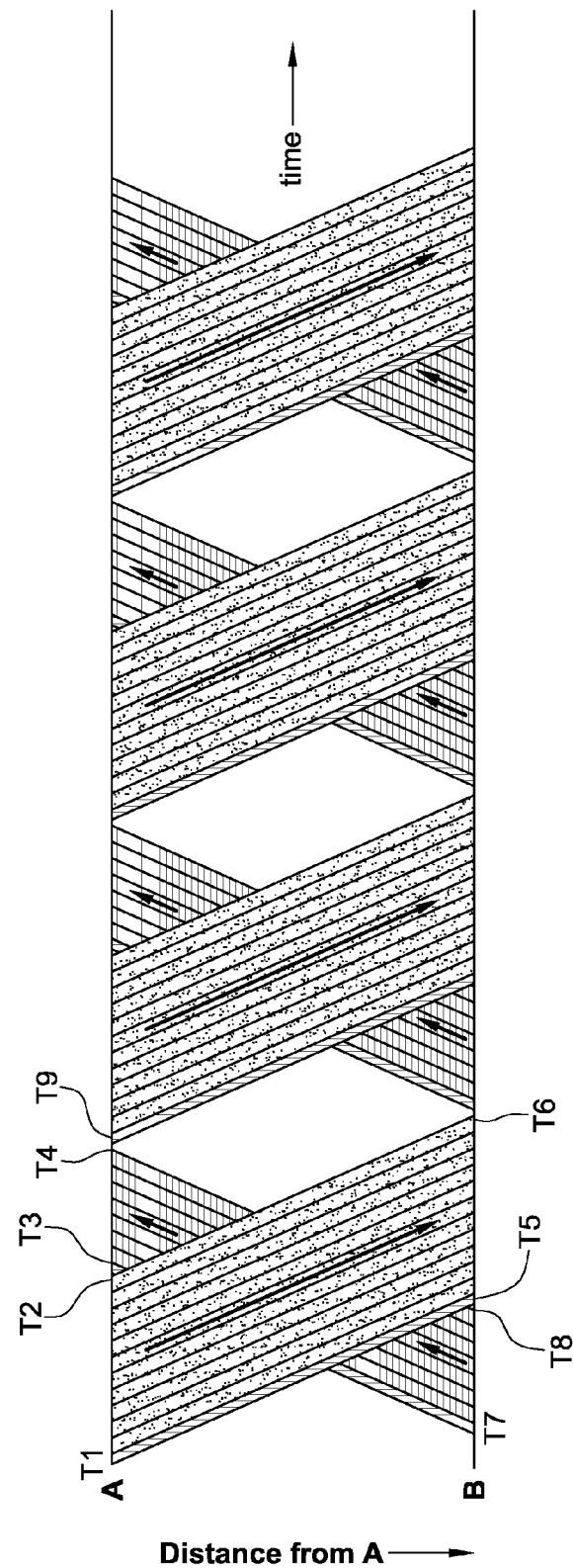
FIG. 3 illustrates a single link example according to certain aspects of the present specification.

FIG. 3 illustrates a single link example according to certain aspects of the present specification. Here master node A transmits during the period of T2–T1 and that transmission is received by remote node B during the time period T6–T5. Note that this embodiment is more efficient than conventional systems because remote node B is transmitting in the time period T8–T7, whereas conventional systems would not both be transmitting at the same time. The remote node B stops its transmission just before the traffic load from master node A arrives at remote node B. Similarly, the traffic load transmitted by remote node B first arrives at master node A after master node A has stopped transmitting. Therefore the communication is successful since the traffic loads are scheduled such that the master node does not simultaneously transmit and receive, and each of the one or more remote nodes do not simultaneously transmit and receive, and the scheduling is arranged with the transition time (the time changing from transmitting to receiving) is minimized. Moreover, the transition time is minimized at all the remote nodes.

In the example shown in FIG. 3, there is almost no idle time because master node A is transmitting or receiving a higher percentage of the time than with conventional systems. This increase in efficiency is illustrated by the small values for T3–T2 and T9–T4.

For example and without limitation, elements of the current disclosure, as applied to the access/aggregation point in a network having a number of remote nodes, have the affect of reducing the idle time of that access point (master node) while at the same time making the frame duration as short as possible under the hardware and time resolution constraints. FIG. 3 shows how the frame duration may be made comparable to or shorter than the propagation time from the master node to the periphery of the network.

Figure 4:
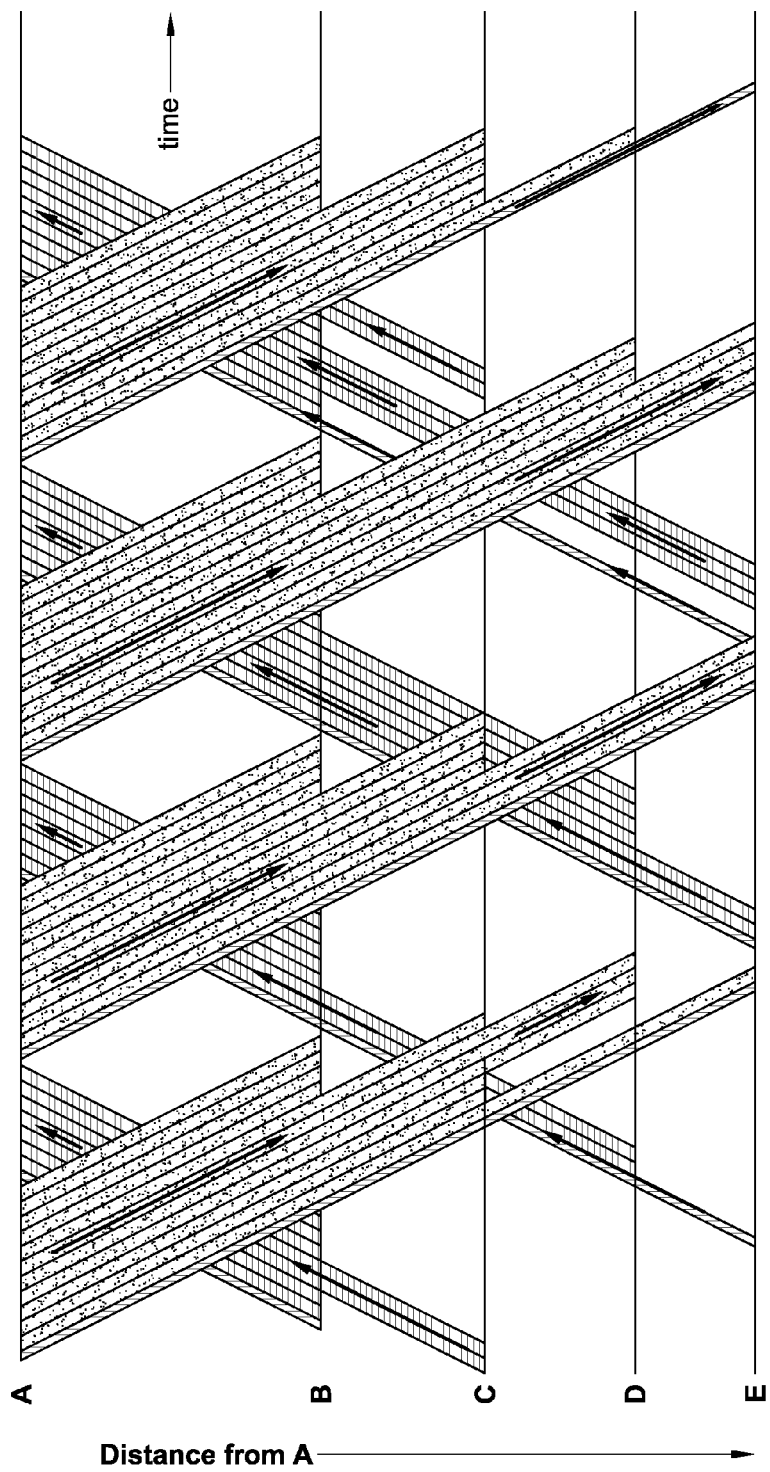
FIG. 4 shows a graphical depiction of a multi-node system according to certain aspects of the present specification.

FIG. 4 shows a graphical depiction of a multi-node system according to certain aspects of the present specification. This embodiment may be used to greatly improve network traffic carrying capacity and reduce MAC overhead to a minimum thereby resulting in large improvements in delivered data rates, especially if the remote nodes are a large distance from the master node.

In FIG. 4, master node A sends data (dotted pattern) to multiple remotes (B, C, D, E) located at varying distances and receives data from the remote nodes (cross hatched pattern) and potentially achieves full utilization. The TDD system of FIG. 4 may operate on similar principles as those described for FIG. 3.

The use of scheduling for the uplink transmissions minimizes collisions at the aggregation point receiver which may operate continuously except when transmitting and during the turn-around part of the frame. One having skill in the art will appreciate that directional antennas with sufficient front-to-back ratios may be used to minimize the affect of signals emanating from "wrong" directions (such as node C receiving signals from A while an uplink signals from D and E are passing it on the way to A).

Ranging

For the present specification timing and scheduling may include the remote node knowing when the master node may be in the receive mode. It is also preferable that the remote node have a sufficiently accurate propagation time estimate and timing reference before transmitting. More accurate time references and propagation delay estimates may result in improved time utilization and efficiency. For example and without limitation, a sufficiently accurate propagation time estimate may mean a frame efficiency of greater than 50%.

The initial process of synchronizing the remote nodes to the master node may require an exchange of information between the master node and each remote node. One conventional approach is for the master node to emit broadcast signals (called pre-amble or pilot messages) which the remote nodes are pre-programmed to recognize and measure the time of arrival. Hence, synchronization is obtained by the master node transmitting a broadcast signal to one of the one or more remote nodes. One skilled in the art will recognize that there are other methods to synchronize the nodes and that ranging may be dynamic and employ multiple iterations under different conditions including error correction to optimize synchronization.

The rate of emission of these messages is determined by the accuracy of the time reference of the remote nodes and the achievable and tolerable gaps between the uplink transmissions from the remote nodes to the master node that at the same time keep temporal overlap between the successive uplink messages to a negligible level. There are identifiable opportunities for the remote nodes to send registration/ranging messages so that the round-trip propagation delay may be established for each remote node. For example and without limitation, schedules for such transmissions and receptions may be developed based on at least two situations. First, the master node collects and integrates the information based on its knowledge of the messages to be transmitted to the remote nodes. Second, the remote nodes notify the master node of their intent to transmit message(s) to the master node.

Scheduling

The master node may create a schedule from this information and may impose this schedule on the one or more remote nodes. This schedule provides a plan for the transmission and reception operation at the master nodes and each remote node and may offer scheduling choices to the remote nodes. Specifically, the schedule may include a plan (that may include options) for when the each node transmits and what traffic load will be transmitted during that transmission period. The method of the present specification is dynamic inasmuch as the schedule may be revised or adapted during a transmission period, i.e. on a frame by frame basis. The action for the master node to give permission to a remote node to transmit may be called a request grant protocol.

Periodically, confirmation (periodic ranging) messages may be sent in fixed-location systems and may be sent relatively infrequently. Once a remote node obtains ranging information and registers with the master node, it enters normal communication mode. A normal communication mode means that the remote node is ready to exchange user data (not just preparatory handshakes). More frequent confirmation messages may be required for mobile remote nodes.

The scheduling process may entail the remote nodes listening to the pertinent control messages from the master node and refraining from transmission at those times. Thus, the remote nodes refrain from transmitting based on control messages from the master node.

For better efficiency of traffic loads, especially larger frames, the following one or more of message handshakes may be useful. The handshakes include:

a. Communicating from one or more remote nodes to the master node the remote node's desire to transmit the remote node's traffic loads (using contention intervals);
b. Sending available transmission options from the master node to one of the remote nodes (these may be discrete intervals of time); and
c. Selection by one of the remote nodes of an option with registration and ranging message information and notifying the master node regarding the remote node's selection.

Another aspect of the current disclosure is the granularity of the transmission intervals, in particular the frame size. For example and without limitation, the frame size may be a small multiple of the symbol size. It may also be important for the system clock to have sufficient accuracy and precision for the method of the present specification to provide optimal effectiveness. For example, each transmission has to start with a recognizable pattern that together with the expected time of arrival permits the receiver to decode the transmitted data. The tighter the timing window, the simpler the start-of-transmission header, although there may be a limit imposed by the RF channel with multipath and fading effects. One having skill in the art will recognize that a tradeoff between less restrictive conditions on the transmitter and a more complex and intensive processing at the receiver may allow for a more extensive correlation process to recognize more allowable and feasible signals.

Multi-Sector Cells

Intra-cell synchronization is feasible with coordination between the sector APs, where a sector AP does not receive a signal while another sector AP in same cluster is transmitting on the same or adjacent frequency or channel. This aspect may be preferable in TDD systems because the isolation between the sector transceivers is generally insufficient for independent operation, loss due to orientation and physical separation, polarization, and frequency separation. The intersymbol interval (an allowance for inaccuracy in timing) may be 200 nanoseconds (60 meters in the air), with assumed error in ranging of less than 10 nanoseconds. With a conventional approach, the queuing delay increases proportionally to the round-trip delay per frame.

Master Node and Multiple Remotes

Figure 5A:
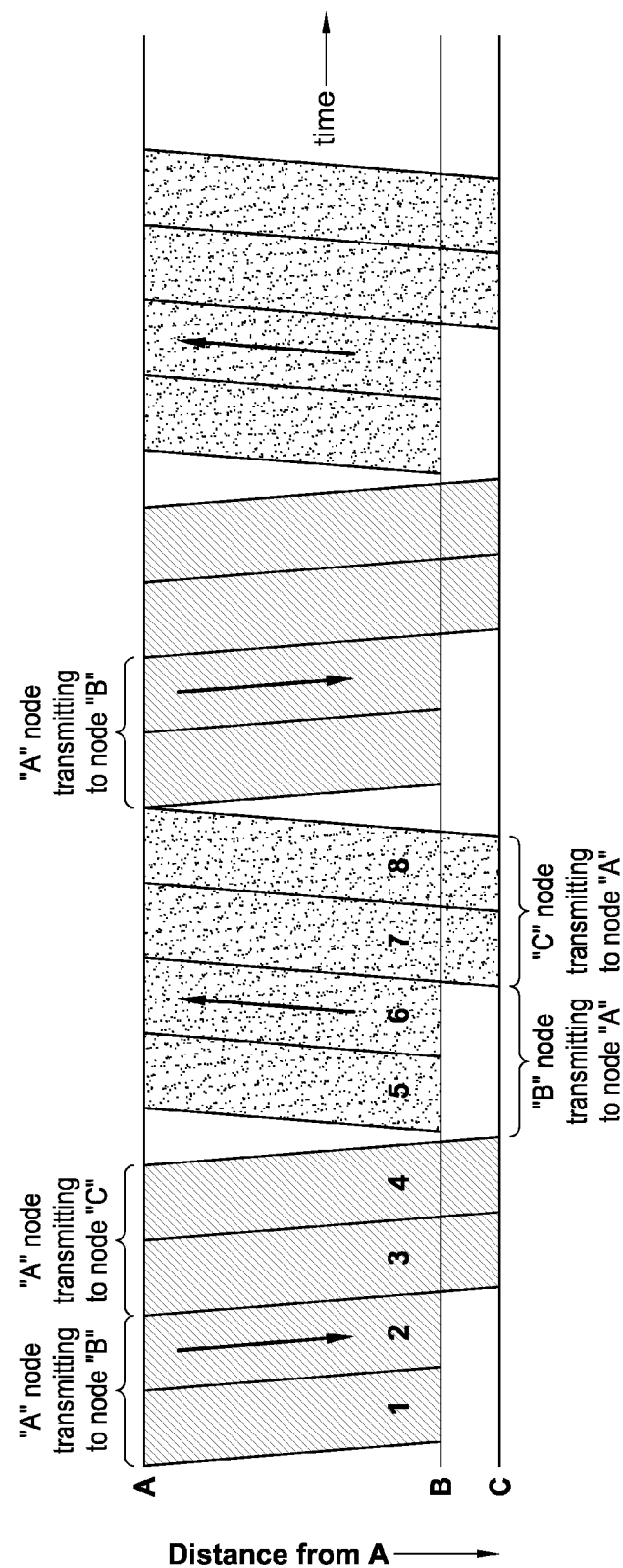
FIG. 5 illustrates comparisons for 5 microsecond propagation time between host and remote sites for certain conventional applications and embodiments according to the current disclosure.

FIG. 5A illustrates a TDM system with a master node A and remote nodes B and C. For example and without limitation, the distance between master node A and remote node B is 1.5 km and has a propagation time of 5 μsec. This example of an OFDM system with symbols of duration 16 psec, shows the AP transmitting 4-symbols for a period of 64.2 μsec interleaved with the 4-symbol reception intervals of 64.2 μsec. (The 4 symbols are illustrated on FIG. 5A by the labels "1", "2", "3", and "4".) This example may be applicable to the case of a processing system using 64 FFT, 5 MHz clock and ¼ CP and 200 nsec, although this example is merely illustrative.

Figure 5B:
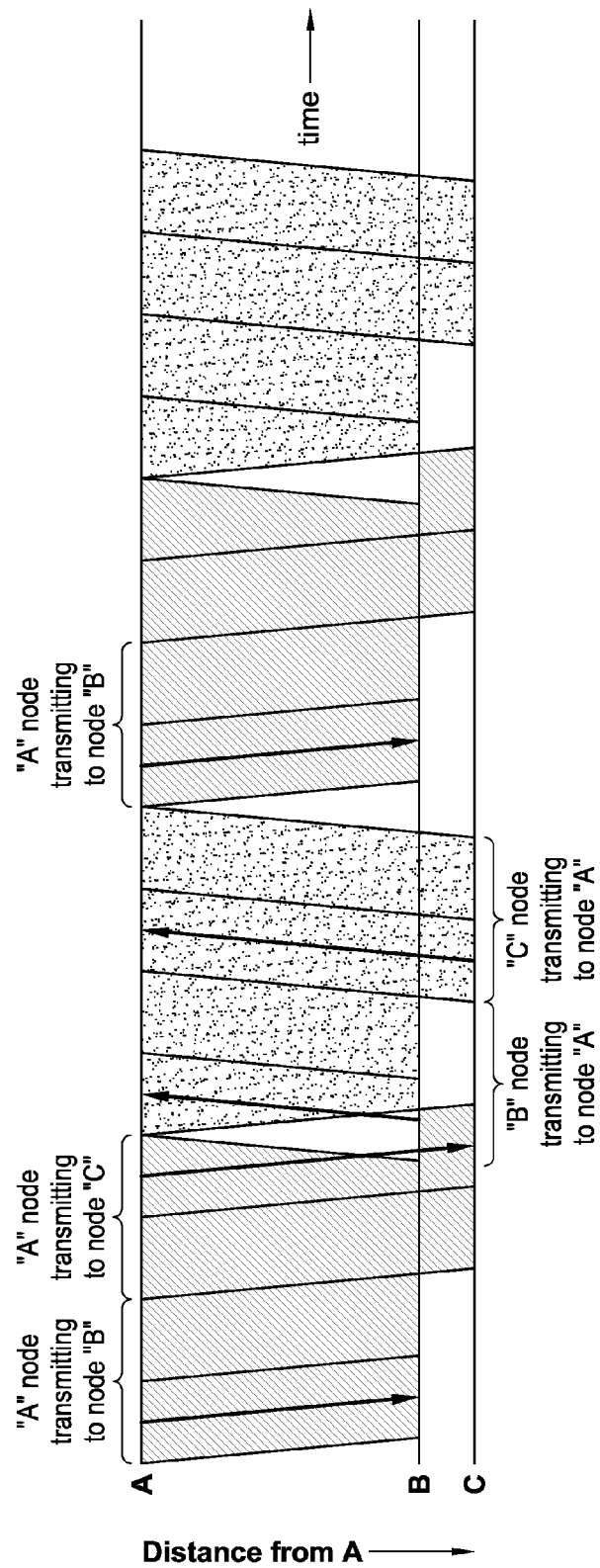

For short links such as the embodiment of FIG. 5A, the benefit of embodiments of the present specification may be modest. As illustrated in FIG. 5B, the method of the present specification is applied and shows the "B" node transmitting to Node "A" before the A node has completed its transmission to the remote nodes. It is noted that the master node stops transmitting before the remote node transmission is received.

As the links get longer, certain benefits of the present specification become more apparent. For example the total delay in delivering the data communication increases by the incremental propagation time in one direction and the capacity of the AP is not reduced by the idle periods between the end-of-transmit and start-of-receive operation. This way the choice of the duration of transmit and receive periods is not dictated by the tolerable efficiency/latency tradeoff, but becomes a tradeoff between acceptable efficiency and achievable accuracy of synchronization between the AP and the remotes.

Consider an example where the distance between master node A and remote node B is 6 km and has a propagation time of 20 μsec. With the greater distance between master node A and remote node B, the example may have a greater frame efficiency as compared to the example of FIG. 5B. Hence, the frame efficiency may increase as distance between master nodes and one or more remotes increases.

As another example, if one station in a communications link is installed so that two transceivers (such as "B" and "C" in FIG. 5B) are not interfering with each other, then one station may receive signals from node A while the other is transmitting. Such installations may be effectuated using modest (i.e. several meters) separation betweens node B and node C and optimized antenna patterns. Otherwise the basic data segment duration may be a fraction of the one-way propagation delay. This aspect may be more readily realized with a single-carrier physical layer (PHY), where the individual symbols are on the order of 100 nanoseconds. In the case of multicarrier PHY, the symbol duration may be changed by the FFT size.

Figure 6:
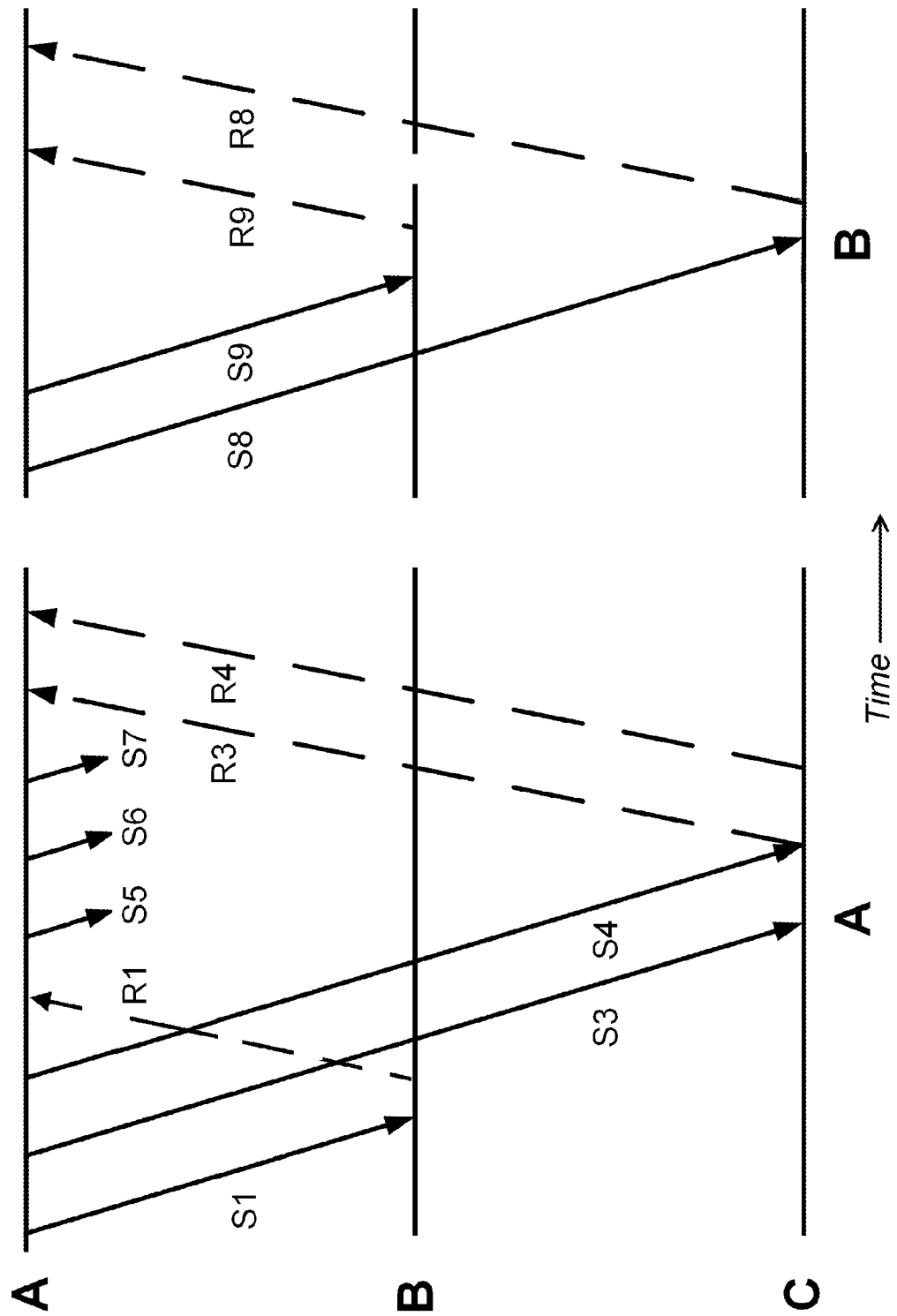
FIG. 6 illustrates an example with asymmetrical traffic loads between a master node and two remote nodes.

FIG. 6 illustrates an example with asymmetrical traffic loads between a master node and two remote nodes. Here, by way of example, there is one symbol transmitted from an "A" node (the master node) to remote node B (S1) and 2 symbols transmitted (S3 and S4) from the master node A to remote node C, thus illustrating the increase in the frame efficiency.

In FIG. 6A, signal S1 arrives at remote node B, is processed by remote node B, and reply signal R1 is transmitted. As shown in this example, the master node A also transmits signals S3 and S4 intended for remote node C during the time that signal S1 is traveling to and being processed by remote node B. This allows for the master node A to receive and process reply signal R1 while signals S3 and S4 are traveling, being processed, and replies (R3 and R4) travel back to the master node A.

Signal S3 and S4 travel to remote node C, are processed and replies R3 and R4 are received at node A. In the example shown, the remote nodes C is twice the distance from the master node A, and the latencies for each unit are substantially equal. However, in practice, this is unlikely to be the case. Here, signals S5, S6 and S7 illustrate other signal activity by the master node A. The quantity and timing of these signals (S5-S7) would generally be in response to the systematic timing of the signal operation described above.

One having skill in the art will recognize from the example of FIG. 6A that latencies of the master node and the various remote nodes are some of the parameters that determine the timing for efficient data transmission. A transmission schedule may be developed taking into account the amount (and transmission time) of data, the inherent latencies of a node, the distance between the stations and the like.

FIG. 6B illustrate an alternative timing scheme. In FIG. 6B the master node A transmits signal S8 to remote node C. In this example, remote node C is further from the master node A than remote node A and will consequently have a longer travel time. (Remote node C may also have a longer latency.) If the time from the completed transmission of signal S8 and the anticipated reply signal R8 is sufficient, the master node A may communicate with remote node B by sending signal S9 and receiving reply R9. Although this example is shown with signals arriving in order, there is no reason to limit this disclosure in that regard. For example and without limitation, signal R8 could arrive before signal R9, and a communications schedule could provide for that operation when the communication parameters allow.

For reference purposes only it is noted that latencies of several hundred microseconds are common in the packet wireless communication systems. For comparison, it is noted that long term evolution (LTE), which is FDD, packs 7 symbols (6 in a long-CP mode for high delay spread environments) in 500 µsec. The specifications of a number of point-to-point FDD packet systems may also have delays on the order of 200 µsec. Even "bit-pipe" systems need some time to deal with forward error correction. The propagation delay may affect these cases.

One having skill in the art will notice that as the links get longer for a particular case of point-to-point operation, the distinction between "master node" and "remote node" may become arbitrary or artificial.

Processing Steps

The adaptive synchronous protocol as disclosed herein may employ one or more of the following steps to optimize implementation. These steps include, but are not limited to:
 a. Synchronizing the master node with the one or more remote nodes, wherein synchronization is based on an external source and the master node receives ranging information.
 b. Communicating from each of the one or more remote nodes to the master node traffic load information to be transmitted from each of the one or more remote nodes to the master node. The traffic node information may include, but is not limited to, payload information, timing information, synchronization information and the like.
 c. Scheduling the transmission of traffic loads from the master node to remote nodes, and from the one or more remote nodes to the master node so that the master node does not simultaneously transmit and receive, and each of the remote nodes do not simultaneously transmit and receive, and scheduling is arranged with the transition time minimized. The transition time being the time changing from transmitting to receiving, and from receiving to transmitting at the master node and at the remote nodes.
 d. Generating a schedule based on the transmission of the traffic loads to and from the master node and each of the remote nodes.
 e. Communicating a schedule to each of the remote nodes.
 f. Transmitting the traffic loads based upon the schedule to and from the master node and the remote nodes.

One having skill in the art will appreciate that the steps described above may be repeated as needed to effectuate maximum frame efficiency. Also, ranging, scheduling and processing may be carried out by various equipment that constitute a network. Accordingly, the steps described herein may be distributed among different equipment (master nodes, remote nodes, APs, controllers, and the like) all working in tandem to effect the desired result.

The master node may transmit a broadcast signal to the remote nodes or receive a broadcast signal from the remote nodes in order to synchronize the remote nodes. The broadcast signal may comprise a pre-amble, a pilot message and the like.

With the adaptive synchronous protocol and an external synchronization source, the one or more remote nodes may begin transmitting before the master node is finished with its transmission, and the master node may begin transmitting before the one or more remote nodes is finished with its transmission as allowed by propagation delay and data packet transmission duration.

The degree of overlap of the transmission of the master node and the one or more remote nodes is proportional to the distance between the remote node and the master node. Communication is facilitated based on a schedule of planned traffic loads from the master node to the one or more remote nodes, and from the one or more remote nodes to the master node, The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A method comprising:
 transmitting from a master node to one or more remote nodes, a synchronization signal, said synchronization signal operable to cause the one or more remote nodes to transmit according to a predetermined timing;
 receiving at the master node a response to the synchronization signal, said response providing propagation time information, and
 transmitting, from the master node to the remote nodes, schedule information causing at least one of the remote nodes to transmit information to the master node while the master node is transmitting on substantially the same channel.

2. The method as in claim 1 wherein the synchronization signal is based on an external source.

3. The method as in claim 2 wherein a synchronization source is provided by a global time reference.

4. The method of claim 1 further including:
receiving, at the master node, traffic load information from at least one of the remote nodes;
transmitting to the at least one remote nodes, schedule information, said schedule information operable to cause the remote nodes to transmit traffic on a predetermined schedule.

5. The method of claim 4 wherein the traffic loads of the master node and the remote nodes are asymmetrical.

6. The method as in claim 1 wherein the master node transmits a broadcast signal to one or more remote nodes to synchronize the one or more remote nodes.

7. The method of claim 6 wherein the broadcast signal includes either a pre-amble or a pilot message.

8. The method of claim 1 wherein scheduling is implemented with a three message handshake comprising:
communicating from at least one of the one or more remote nodes to the master node, the communicating comprising an indication of a desire to transmit one or more traffic loads;
sending available transmission options from the master node to one of the one or more remote nodes, and
selecting by the one of the one or more remote nodes an option with registration and ranging message information and notifying the master node of the selection.

9. The method of claim 1 wherein the one or more remote nodes refrain from transmitting based on control messages from the master node.

10. The method of claim 1 wherein scheduling occurs on a frame by frame basis.

11. The method of claim 1 further including:
coordinating between a plurality of sector access points wherein a sector access point does not receive a signal while another sector access point in same cluster is transmitting on either the same or a substantially close frequency.

12. The method of claim 1 wherein the one or more remote nodes begin transmitting before the master node is finished with its transmission, and the master node begins transmitting before the one or more remote nodes is finished with its transmission.

13. The method of claim 12 wherein the transmitting is modified to correct for propagation delay and data packet transmission duration.

14. The method of claim 13 wherein degree of temporal overlap of the transmission of the master node and a remote node is proportional to distance between the remote node and the master node.

15. A system comprising:
a master node;
one or more remote nodes;
a time reference; and
a schedule of planned traffic loads from the master node to the one or more remote nodes, and from the one or more remote nodes to the master node, said schedule based at least partially on a propagation time between the master node and at least one of the remote nodes,
wherein the schedule is arranged to minimize transition time for each node by directing them to transmit substantially simultaneous transmissions on substantially the same channel.

16. The system of claim 15 wherein the one or more remote nodes begin transmitting before the master node is finished with its transmission, and the master node begins transmitting before one or more remote nodes is finished with its transmission.

17. The system of claim 16 wherein degree of temporal overlap of the transmission of the master node and a remote node is proportional to distance between the remote node and the master node.

18. Non transitory media having processor readable code embodied on said media, said processor readable code for programming one or more processors to perform a method including:
transmitting from a master node to one or more remote nodes, a synchronization signal, said synchronization signal operable to cause the one or more remote nodes to transmit according to a predetermined timing,:
receiving at the master node a response to the synchronization signal, said response providing propagation time information, and
transmitting, from the master node to the remote nodes, schedule information causing at least one of the remote nodes to transmit information to the master node while the master node is transmitting on substantially the same band.

19. The media of claim 18 wherein the method further includes:
receiving, at the master node, traffic load information from at least one of the remote nodes;
transmitting to the at least one remote nodes, schedule information, said schedule information operable to cause the remote nodes to transmit traffic on a predetermined schedule.

20. The media as in claim 18 wherein the master node transmits a broadcast signal to one or more remote nodes to synchronize the one or more remote nodes.

* * * * *